United States Patent
Franchville et al.

[11] Patent Number: 6,041,076
[45] Date of Patent: Mar. 21, 2000

[54] DIGITALLY MODULATED CATV POWER MEASUREMENT USING UNDERSAMPLING

[75] Inventors: Douglas J. Franchville, Indianapolis; Daniel K. Chappell, Fishers, both of Ind.

[73] Assignee: Wavetek Corporation, Indianapolis, Ind.

[21] Appl. No.: 08/982,831

[22] Filed: Dec. 2, 1997

[51] Int. Cl.[7] .............................. H04B 17/00; H04B 3/46; H04Q 1/20
[52] U.S. Cl. .......................... 375/224; 455/226.4
[58] Field of Search ............................. 375/224, 377, 375/316, 355; 455/226.1, 226.4, 226.2; 379/1; 370/241

[56] References Cited

U.S. PATENT DOCUMENTS

| | | |
|---|---|---|
| 3,908,165 | 9/1975 | Caudwell . |
| 4,273,955 | 6/1981 | Armstrong . |
| 4,381,546 | 4/1983 | Armstrong . |
| 4,516,216 | 5/1985 | Armstrong . |
| 4,685,065 | 8/1987 | Braun et al. . |
| 4,816,825 | 3/1989 | Chan et al. . |
| 5,093,842 | 3/1992 | Gimlin et al. . |
| 5,166,954 | 11/1992 | Grizmala et al. . |
| 5,307,284 | 4/1994 | Brunfeldt et al. . |
| 5,386,495 | 1/1995 | Wong et al. . |
| 5,451,947 | 9/1995 | Morrison . |
| 5,489,875 | 2/1996 | Cavers . |
| 5,493,210 | 2/1996 | Orndorff et al. . |
| 5,528,507 | 6/1996 | McNamara et al. . |
| 5,533,048 | 7/1996 | Dolan . |
| 5,610,554 | 3/1997 | Anvari ........................ 330/52 |
| 5,619,536 | 4/1997 | Gourgue ...................... 375/316 |
| 5,627,588 | 5/1997 | Edgar ......................... 348/222 |
| 5,654,862 | 8/1997 | Worley et al. . |
| 5,666,358 | 9/1997 | Paratore et al. . |
| 5,710,791 | 1/1998 | Royer et al. ................. 375/224 |
| 5,790,514 | 8/1998 | Marchok et al. ............. 370/208 |

*Primary Examiner*—Chi H. Pham
*Assistant Examiner*—Jean B Corrielus
*Attorney, Agent, or Firm*—Maginot, Addison & Moore

[57] ABSTRACT

A signal power measurement apparatus for measuring the power of a first signal, with the first signal comprising a carrier signal modulated by an information signal. One embodiment of the present invention includes a signal power measurement apparatus comprising a RF receiver, an A/D converter, and a digital signal processing circuit. The RF receiver is operable to receive a first signal and generate an intermediate signal, with the intermediate signal comprising at least a portion of the first signal and having a bandwidth and a cutoff frequency. The A/D converter is operably connected to the RF receiver to receive the intermediate signal. The A/D converter generates a digital intermediate signal based on the intermediate signal, the digital intermediate signal having a sample rate less than twice the cutoff frequency. The digital signal processing circuit is operable to perform a power measurement on the digital intermediate signal, with the power measurement being representative of the power of at least a portion of the first signal.

20 Claims, 3 Drawing Sheets

DIGITALLY MODULATED CATV POWER MEASUREMENT USING UNDERSAMPLING

FIELD OF THE INVENTION

The present invention relates generally to a communication signal power measuring device, and more particularly to a method and apparatus for accurately and efficiently measuring the power level of a digitally modulated communication signal.

BACKGROUND OF THE INVENTION

Communication signals typically comprise analog or digital signals modulated onto a carrier signal, such as a radio frequency ("RF") carrier signal. The information to be communicated is generated as a baseband signal, which is then modulated onto a carrier signal which is transmitted over a transmission medium, such as the atmosphere or a wired communication network such as a cable television ("CATV") network. To increase the capacity of communication networks, the use of digital signals modulated onto RF carrier signals, or digitally modulated signals, has been on the rise.

One communication industry that is increasingly using digitally modulated signals is the CATV industry. CATV systems are communication systems that commonly include an antenna and receiver to receive a RF television signal, a cable transmitter linked to the receiver for the purpose of re-broadcasting the received signal, and a cable distribution network. The cable distribution network commonly includes a coaxial wire cable that extends from the cable transmitter to a large number of subscribers. This cable distribution network can be quite large, and can include many miles of cable, as well as repeaters, splitters, and other network components.

Historically, CATV systems have employed analog modulated signals to rebroadcast television signals. Such analog modulated signals included, for example, as frequency modulated, amplitude modulated, and phase modulated signals. Recently, however, CATV systems have employed digitally modulated RF signals to transmit television signals. Digitally modulated signals are preferred because they can compress the information content of several television signals into the bandwidth normally allocated for a single analog modulated television signal.

At present, CATV systems employ digital modulation techniques that include quadrature amplitude modulation (QAM) and carrierless amplitude/phase modulation (CAP) techniques, to transmit digital signals over a cable distribution network. For example, a QAM16 signal is a 16-state quadrature amplitude modulation that employs four phasors separated in phase by 90 degrees, with each phasor amplitude modulated to one of four levels. This provides sixteen phasors with each one representing a unique 4-bit binary code group. When a QAM16 signal is used, the transmitted signal strength drops off sharply at the upper and lower frequency limits of a given channel, and for a given transmitted bit rate, the bandwidth is smaller than in some other modulation methods. The digital QAM16 channel, therefore, presents a very small and acceptable amount of interference to any adjacent channels. QPR and CAP techniques operate on different principles, but have the same general result. QAM, QPR and CAP digital modulation techniques are well known to those of ordinary skill in the art.

Of the above general modulation techniques, CATV systems presently use QAM64, QAM256, QPR, and CAP-16 to effectuate modulation of digital baseband signals in a highly compressed format. These digital modulation techniques produce a summation of pseudo random sinusoids that are similar in randomness to white noise.

The advent of the use of digitally modulated RF signals in CATV systems has necessitated the development of methods and devices for measuring such signals. In particular, CATV service providers often perform signal strength measurements to determined the condition of the network and the quality of signal transmission thereon. Accordingly, a reliable method of measuring signal strength of digitally modulated signals is necessary.

The signal level measurement of a CATV system has many uses, including detecting and diagnosing faulty equipment, detecting faults in the cable distribution network, and achieving optimum performance in the CATV system. The complexity and size of a cable distribution network require that network operation and performance be periodically tested and monitored.

The signal level measurement technique historically used for analog modulated television signals consisted of a measurement of the amplitude of standard pulse signals, such as the horizontal or vertical synchronization pulses, within the baseband television signal. Such a measurement technique required demodulation of the television signal in order to facilitate isolation and measurement of the pulse signal therein.

Digitally-modulated signals, however, because of their pseudo-random nature, may be measured using simple root mean square ("RMS") power measurement techniques. In particular, RMS power measurement techniques, which measure the spectral energy of the signal under test, cannot be used for analog modulated television signals because signal energy in such signals is greatly dependent on video content. In other words, two signals that are transmitted with the same power may measure different RMS power levels based on whether the program video content has a lot of white information or a lot of black information. Accordingly, a simple RMS power measurement of an analog CATV signal does not provide a reliable indicator of the quality of signal transmission through the CATV network. Digitally-modulated signals, however, are pseudo-random in nature, and thus there is little or no correlation between the program content and the measured RMS signal power. As a result, RMS power measurements are presently employed to measure the signal level of digitally modulated RF signals in CATV systems.

RMS measurements may be carried out by analog or digital methods. For increased accuracy as a function of component cost, digital RMS methods have increasingly been used. In addition, digital circuitry, which typically includes a programmable processor of some type, provides additional flexibility which allows the measurement device to carry out additional types of CATV signal measurements with little or no additional circuitry.

One drawback to the use of digital measurement techniques arises in the context of the conversion of the analog signal to a suitable digital representation of the analog signal. In particular, in order to carry out a digital RMS measurement, the input signal must first be converted to a digital signal. That conversion is typically carried out by an analog to digital ("A/D") converter that samples an analog signal to produce a digital signal therefrom.

A fundamental requirement of analog to digital conversion is that a sampling A/D converter must typically have a sampling rate that exceeds twice the highest frequency component of the signal being measured. In other words, if an analog signal to be converted has a highest frequency component of 1 MHz, then the A/D converter used to convert that signal to a digital signal must have a sampling rate that exceeds 2 MHz. The sampling rate requirement is known as the Nyquist criterion.

The drawback presented by the A/D conversion is that the generation and subsequent processing of digital samples having a sample rate that satisfies the Nyquist criterion can significantly increase component cost of the measurement device. For example, there is a limitation to the sampling rate that is achievable in commercially available, low cost, A/D converters. More importantly even if sufficiently high sampling rate A/D converters are available, there is a cost limitation to the ability of subsequent digital signal processing equipment to process samples generated at such a high sampling rate. The relatively high frequencies of CATV signals further aggravate these cost issues. For example, a CATV television signal may have a carrier frequency of 100 MHz and a bandwidth that extends to 104 MHz. As a result, an A/D converter having at least a 208 MHz sampling rate would be required to satisfy the Nyquist criterion. Moreover, a digital circuit used to perform an RMS power measurement of the signal must employ digital components that are capable of processing samples at that rate. Such devices are either presently unavailable or cost prohibitive.

To reduce the processing speed requirements of such devices, CATV measurement devices using digital measurement techniques typically perform a frequency conversion on the received signal to produce a signal having a relatively low intermediate carrier frequency ("intermediate"). For example, such a device could convert the signal with the 100 MHz carrier such that it had a 100 kHz intermediate carrier. In such a case, the highest frequency component would be approximately 4.1 MHz (i.e., 100 kHz+4 MHz) instead of 104 MHz. Accordingly, the digital devices need only have a processing speed that corresponds to the Nyquist criterion with respect to 4.1 MHz.

While down conversion reduces the processing speed requirements of the digital measurement circuits to some degree, the processing speed required even for such down-converted CATV signals remains relatively high, and contributes significantly to the cost of the circuit. There is a need, therefore, for a device that measures power of digitally modulated communication signals without requiring high speed digital processing circuitry.

SUMMARY OF THE INVENTION

The present invention addresses the above as well as other needs by providing a signal power measurement apparatus for measuring digitally modulated signals that includes a digital measurement circuit operable to use an undersampled digital measurement signal. In other words, the digital measurement circuit carries out a signal power measurement with a digital representation of the signal to be measured that is sampled below twice the frequency of the highest frequency component of the signal to be measured.

One embodiment of the present invention includes a signal power measurement apparatus comprising a RF receiver, an A/D converter, and a digital signal processing circuit. The RF receiver is operable to receive a first signal and generate an intermediate signal, with the intermediate signal comprising at least a portion of the first signal and having a bandwidth and a cutoff frequency. The A/D converter is operably connected to the RF receiver to receive the intermediate signal. The A/D converter generates a digital intermediate signal based on the intermediate signal, the digital intermediate signal having a sample rate less than twice the cutoff frequency. The digital signal processing circuit is operable to perform a power measurement on the digital intermediate signal, with the power measurement being representative of the power of at least a portion of the first signal.

The present invention thus facilitates the use of lower cost circuitry by utilizing an undersampled digital signal to obtain the digital signal power measurement. The use of an undersampled digital signal, or in other words, a digital signal having a sample rate that is less than that required by the Nyquist criterion, reduces processing speed requirements, thereby reducing the processing capability requirements for the A/D converter, the digital measurement circuit, or both.

The above features and advantages of the present invention, as well as others, will become more readily apparent to those of ordinary skill in the art by reference to the following detailed description and accompanying drawings.

DETAILED DESCRIPTION

Figure 1:
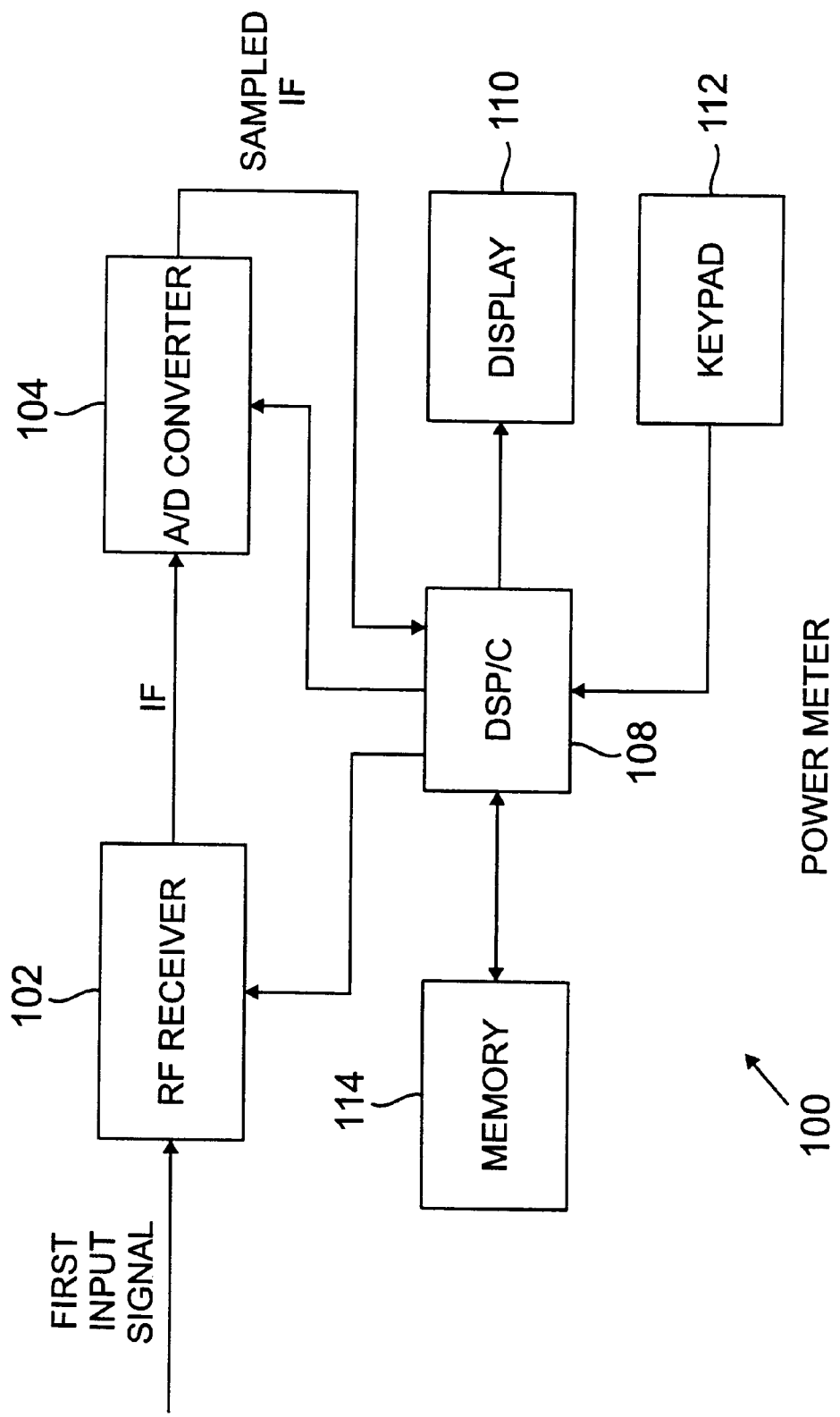
FIG. 1 shows a schematic block diagram of an exemplary signal power measurement apparatus which incorporates various features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a schematic block diagram of an exemplary signal power measurement apparatus 100 which incorporates features of the present invention. The signal power measurement apparatus 100 includes a RF receiver 102, an analog-to-digital (A/D) converter 104, a digital signal processor/controller (DSP/C) 108, a display 110, a keypad 112, and a memory 114.

The RF receiver 102 is configured to receive an RF input signal that includes a first signal through a CATV coaxial cable. The RF receiver 102 is operable to generate an intermediate signal from the first signal. The first signal is a digitally modulated RF signal having a spectral bandwidth which in the present embodiment corresponds to a CATV channel bandwidth, for example, 6 MHz. Specifically, the digitally modulated RF signal comprises a carrier signal having a carrier frequency, which in the present embodiment corresponds to a CATV channel frequency in the frequency range between 5 MHz and 890 MHz. The carrier signal is modulated by one or more multiplexed digital television baseband signals using QAM64, QAM256, QPR, or CAP-16 modulation techniques.

The intermediate signal generated by the RF receiver 102 comprises at least a portion of the first signal and includes a bandwidth defining a cutoff frequency. In addition, the RF receiver 102 is preferably further operable to perform a frequency conversion on the first signal, such that the intermediate signal cut-off frequency is substantially less than the carrier signal frequency. In the exemplary embodiment described herein, the intermediate signal bandwidth is 280 kHz, with a cutoff frequency of 285 kHz. The RF receiver 102 is further operable to provide initial conditioning to the first input signal.

The A/D converter 104 comprises an electrical circuit that is operably coupled to receive the intermediate signal from the RF receiver 102. The A/D converter 104 may suitably be a commercially available A/D converter that employs successive approximation techniques or sigma delta modulation techniques.

The A/D converter 104 is operable to generate a digital intermediate signal from the received intermediate signal, wherein the digital intermediate signal has a sample rate of less than twice the cut-off frequency. To this end, the A/D converter 104 may suitably have a sampling rate that is less than twice the cutoff frequency.

Alternatively, however, the A/D converter 104 may generate a pre-sampled signal having a much higher sampling rate, wherein the pre-sampled signal includes the digital intermediate signal. For example, the A/D converter 104 may have a 1 MHz sampling rate, which may be higher than twice the cut-off frequency. However, as will be described more fully below, the digital intermediate signal comprises only every Nth sample of the pre-sampled signal, and thus has a sampling rate of 1,000,000/N. Regardless of whether the A/D converter 104 generates a pre-sampled signal having a sample rate in excess of twice the cut-off frequency, the digital intermediate signal generated by the A/D converter 104 has a sample rate that is less than twice the cut-off frequency.

In the preferred embodiment, the digital intermediate signal has a sampling rate of 7812 samples per second and a 12 bit resolution. The digital intermediate signal output by the A/D converter 104 is a digital representation of the intermediate signal.

The DSP/C 108 is operably coupled to receive the digital intermediate signal from the A/D converter 104. The DSP/C 108 is a circuit that is operable to perform a digital signal power measurement on the digital intermediate signal. The digital signal power measurement generates a power measurement value that is representative of the power of at least a portion of the first signal supplied to the RF receiver 102. To this end, the DSP/C 108 preferably is operable to perform a root mean square ("RMS") operation on the received digital intermediate signal. The result of the RMS calculation provides a power measurement of the intermediate signal, which in turn is representative of the power of at least a portion of the first signal. A flowchart of an exemplary set of operations carried out by the DSP/C 108 to perform the RMS calculation is provided in FIG. 3 and discussed further below.

In the exemplary embodiment described herein, because the intermediate signal comprises only a portion of the first signal, the RMS calculation on the digital intermediate signal generates a power measurement value that is representative of only a corresponding portion of the first signal. The DSP/C 108 may, however, perform additional processing to generate a power measurement value that is representative of the entire first signal.

To generate a power measurement for the entire first signal, the DSP/C 108 may cause subsequent measurements to be performed for subsequent intermediate signals, each of which corresponding to a distinct spectral portion of the input signal. Alternatively, the DSP/C 108 may use interpolation techniques on the power measurement value of the intermediate signal to obtain a power measurement value for the entire first signal.

In any event, the DSP/C 108 is configured to perform the root mean squares operation on 1,953 received samples of the digital intermediate signal, or in other words, one quarter-second's worth of samples.

In addition to carrying out the digital measurement method described above, the DSP/C 108 is also operably connected to control the operations of both the A/D converter 104 and the RF receiver 102. The DSP/C 108 is further connected to the keypad 112 and the display 110. The keypad 112 provides a means for accepting user input and the display 110 provides a means of communicating results, for example, information representative of the power measurement value, to a user.

The DSP/C 108 is furthermore connected to the memory 114. The memory 114 is included, to store information needed by the DSP/C 108 to both control the operations of the signal power measurement apparatus 100 and perform the digital signal processing functions.

The DSP/C 108 thus is shown to carry out both digital signal processing tasks, such as those required to generate power measurements of the digital intermediate signal, and controller tasks. Such tasks may suitably be carried out by a circuit comprising a digital signal processing circuit and a microcontroller or the like.

In the exemplary embodiment described herein, however, the DSP/C 108 is implemented as a microprocessor, in particular, a model MC68331 microprocessor available from Motorola Corp. The microprocessor may be programmed to operate both as a digital signal processing circuit to carry out the RMS measurement described above, and as a controller, to control the operations of the various components of signal power measurement apparatus 100, as described above. Those of ordinary skill in the art may readily determine the architecture of the digital signal processor and controller circuitry that best suits their particular implementation. It is noted, however, that the use of the same microprocessor as both a digital signal processing device and a controller further reduces component cost.

Figure 2:
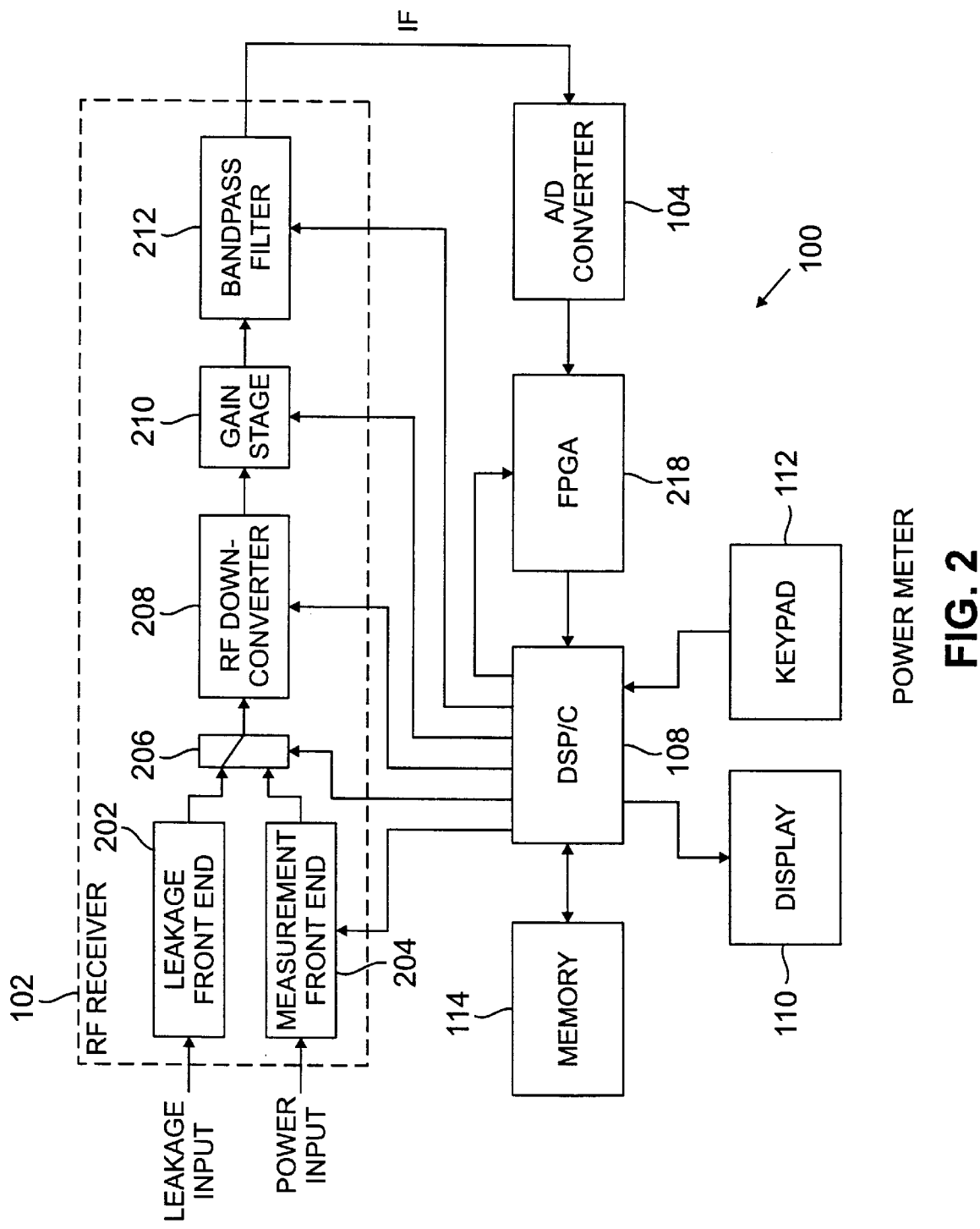
FIG. 2 shows a schematic block diagram of a preferred embodiment of the signal power measurement apparatus of the present invention.

Referring now to FIG. 2, there is shown a more detailed schematic block diagram of an exemplary embodiment of the signal power measurement apparatus 100. For convenience, equivalent components in FIGS. 1 and 2 are identified by the same reference numerals. The exemplary embodiment incorporates several features of the present invention. In general, the signal power measurement apparatus 100 performs a digital power measurement on digitally modulated RF signals using an undersampled digital intermediate signal.

In addition to signal power measurements, the exemplary embodiment of the signal power measurement apparatus 100 includes the capability to perform a plurality of additional CATV system measurements, including CATV system leakage detection. Such additional capabilities, such as leakage detection, are outside the scope of the present invention, and will not be discussed in detail herein.

It will be noted that the signal power measurement apparatus 100 is shown in schematic block diagram form only. Those of ordinary skill in the art may readily implement the detailed circuitry required to carry the functions ascribed to the various blocks of FIG. 2. Moreover, further detail of an exemplary hardware implementation of the signal power measurement apparatus 100 may be found in U.S. patent application Express Mail No. EM020939786US, which is assigned to the assignee of the present invention and incorporated herein by reference.

As shown in FIG. 2, the RF receiver 102 includes a leakage front end 202, a measurement front end 204, a coupling device 206, a RF conversion circuit 208, a gain stage 210, and a band pass filter 212.

The leakage front end 202 comprises a RF input circuit that is operable to receive, and provide conditioning to, leakage input signals received from an external leakage input, which may suitably be an antenna. The leakage front end is operatively coupled to the coupling device 206.

The measurement front end 204 comprises a RF input circuit that is operable to receive and provide initial conditioning to an input signal received from the CATV input. In the CATV testing implementation, the measurement front end 204 is operable to receive an RF input signal having a signal band within a frequency range between 5 MHz and 890 MHz. The RF input signal includes a first signal to be measured, which typically has a signal band that corresponds to a CATV channel frequency band. In general, the measurement front end 204 provides initial conditioning to the RF input signal by providing level adjustment, filtering, and impedance matching if necessary. The DSP/C 108 controls to some extent the operation of the measurement front end 204. For example, the DSP/C 108 controls the level adjustment provided to the RF input signal by the measurement front end 204. The measurement front end 204 is operatively connected to the coupling device 206.

The coupling device 206 may suitably be any device or circuitry that connects both the leakage front end 202 to the RF conversion circuit 208 and the measurement front end 204 to the RF conversion circuit 208 while providing isolation between the leakage front end 202 and the measurement front end 204. The coupling device 206 may, for example, be a diode switch, a GaAs FET switch, or a hybrid directional RF coupler. The coupling device 206 is operably connected to the DSP/C 108 for the purpose of receiving a command signal that causes the coupling device 206 to connect a select one of the leakage front end 202 and the measurement front end 204 to the RF conversion circuit 208.

The RF conversion circuit 208, which may include one or more local oscillator (LO) stages, is capable of performing a mixing function to convert the RF input signal such that a select spectral portion of the first signal is down converted to the intermediate signal bandwidth. In the exemplary embodiment described herein, the intermediate signal bandwidth is between 5 kHz and 285 kHz. To this end, the RF conversion circuit 208 is operably connected to receive appropriate control signals from the DSP/C 108.

Thus, for example, if the first signal is a digitally modulated CATV signal having a carrier frequency of 100 MHz and a bandwidth of from 98 MHz to 104 MHz, the RF conversion circuit 208, responsive to control signals from the DSP/C 108, is operable to convert a 280 kHz spectral portion of the first signal, for example, from 100 MHz to 100.28 MHz, such that the 280 kHz spectral portion has a converted spectral bandwidth of between 5 kHz and 285 kHz.

In any event, the RF conversion circuit 208 may also be operable to provide some filtering to the down-converted first signal. The RF conversion circuit 208 is further operably connected to provide the down-converted first signal to the gain stage 210.

The gain stage 210 is a circuit that is operable to provide a controlled amount of amplification to the down-converted RF input signal. To this end, the gain stage 210 is operably connected to the DSP/C 108 to receive control signals identifying the appropriate amplification amount. The appropriate amplification amount may vary depending on whether the signal power measurement apparatus 100 is employed for signal power measurement, leakage detection, or another functionality.

The band pass filter 212 is a filter having a pass band defined by the intermediate signal bandwidth. Accordingly, in the exemplary embodiment described herein, the band pass filter 212 has a pass band from 5 kHz to 285 kHz. The band pass filter 212 is shown as being controllable by the DSP/C 108 to facilitate adjustment of the pass band for other device functionalities such as leakage detection.

The band pass filter 212 thus is operable to receive the down-converted RF input signal and generate the intermediate signal therefrom, wherein the intermediate signal constitutes a down-converted spectral portion of the first signal and has a signal bandwidth and a cut-off frequency. In the exemplary embodiment described herein, the intermediate signal bandwidth is from 5 kHz to 285 kHz, or in other words, 280 kHz with a cut-off frequency of 285 kHz.

As shown in FIG. 2, the A/D converter 104 is connected to the DSP/C 108 through a field programmable gate array (FPGA) 218. The A/D converter 104 is discussed above in connection with FIG. 1. In general, the A/D converter 104 is operable to receive the intermediate signal and generate a digital intermediate signal therefrom, wherein the digital intermediate signal has a sample rate that is less than twice the intermediate signal cut-off frequency. In the exemplary embodiment described herein, the A/D converter 104 produces a pre-sampled signal having a sample rate in excess of the sample rate of the digital intermediate signal. That pre-sampled signal, however, includes the digital intermediate signal.

The reason that the A/D converter 104 is operable to generate a pre-sampled signal at a faster sampling rate relates to the fact that the signal power measurement apparatus 100 performs other types of measurements, such as leakage detection, in which a higher sampling rate is required. Accordingly, in an alternative embodiment in which the signal power measurement apparatus 100 performs only RMS power measurements as described herein, the A/D converter 104 may suitably have a sampling rate that is equal to the sample rate of the digital intermediate signal.

The A/D converter 104 is configured to provide the pre-sampled intermediate signal to the FPGA 218. The A/D converter 104 in the exemplary embodiment employs a sampling rate of 1 MHz, although a much lower sampling rate may be used.

The FPGA 218 is operably coupled to receive the pre-sampled intermediate signal from the A/D converter 104. The FPGA 218 device comprises a programmable logic array in which the internal connections of the logic gates can be programmed. In the preferred embodiment the FPGA 218 is configured to operate in multiple modes, including a peak mode and a sample mode.

In the peak mode, the FPGA 218 is configured by the DSP/C 108 to receive the pre-sampled intermediate signal from the A/D converter 104 and provide a predetermined number of peak value samples of the pre-sampled intermediate signal to the DSP/C 108. In particular, the FPGA obtains a first peak of a first plurality of adjacent samples, for example, ten samples, then obtains a second peak of a second plurality of adjacent samples, and so forth. The FPGA 218 is operable to provide such peak value samples to the DSP/C 108, which in turn utilizes the peak value samples for the purpose of signal level normalization.

In the sample mode, the FPGA 218 is configured by the DSP/C 108 to operate as a flow through buffer that merely connects the A/D converter 104 to the DSP/C 108.

The DSP/C 108 is operably connected to the FPGA 218 to receive the digital intermediate signal therefrom. In the exemplary embodiment described herein, the digital intermediate signal is defined as every Nth sample of the pre-sampled intermediate signal. Thus, the DSP/C 108 is operable to receive the digital intermediate signal by obtaining every Nth sample of the pre-sampled intermediate signal, where N is referred to as the down-sampling factor. The sample rate of the digital intermediate signal is thus defined by the sampling rate of the A/D converter 104 divided by N.

For example, if the A/D converter 104 generates a pre-sampled intermediate signal having a sample rate of one million samples per second, and N is equal to 256, then the down-sampled signal represents every 256th sample of the pre-sampled intermediate signal. The down-sampled signal or digital intermediate signal is provided to the DSP/C 108.

It will be noted that the use of the A/D converter 104 having a higher sampling rate than the sample rate of the digital intermediate signal is given by way of example only. Such an architecture has advantages that relate primarily to other functionalities of the signal power measurement apparatus 100, such as leakage detection. In alternative embodiments, the A/D converter 104 may simply have a much lower sampling rate, such as one below the twice the intermediate signal cut-off frequency, thereby further reducing the component cost of the signal power measurement apparatus 100. Such an embodiment may be appropriate in implementations that exclusively measure the power levels of digitally modulated RF signals.

Regardless of the specific implementation of the A/D converter 104, the use of an A/D stage 104 that generates a digital intermediate signal received by the DSP/C 108 that has a sample rate less than twice the cut-off frequency of the intermediate signal reduces the cost and operational complexity of the overall device.

The DSP/C 108 is operably connected to control the leakage front end 202, the measurement front end 204, the coupling device 206, the RF conversion circuit 208, the band pass filter 212, the gain stage 210, and the FPGA 218. The DSP/C 108 is further connected to the display 110, the keypad 112, and the memory 114. The memory 114 can be used by the DSP/C 108 to perform a variety of functions, including storing inputs, storing controller programming, and saving measurement results for future use or display. It will be noted that in an alternative embodiment in which the controller functionality and the digital signal processing functionality are carried out by separate circuits, the controller would further control the operations of the digital signal processing circuit.

The keypad 112 provides a means for accepting user input and the display 110 provides a means of communicating results to a user. Results may also be communicated by an audible signal, including those generated using speech synthesis. Alternatively, results may be provided to a communication circuit, not shown, to facilitate the transfer of the results information to a remote device.

In operation, the user may manually select via the keypad 112 from the many functions of the signal power measurement apparatus 100. It is assumed for the purposes of discussing the present invention that the user selects through the keypad 112 to perform a power measurement on a digitally modulated RF signal.

The user typically also selects, via the keypad 112, a first signal to be measured. The selected first signal is assumed to be a digitally-modulated RF signal having a channel or carrier frequency within the CATV frequency spectrum. In the embodiment described herein, the digitally-modulated RF signal includes a plurality of digital baseband signals modulated onto the carrier frequency using QAM, QPR, or CAP methods, resulting in a pseudo-random RF signal having a signal strength spectrum that approximates that of white noise.

Because the signal power level measurement functionality is selected, the DSP/C 108 causes the coupling device 206 to connect the measurement front end 204 to the RF conversion circuit 208. The DSP/C 108 then configures the RF conversion circuit 208 to convert a select spectral portion of the first signal to the intermediate signal bandwidth. As discussed above, the intermediate signal bandwidth is 280 kHz in the exemplary embodiment described herein. Accordingly, the select spectral portion must be a 280 kHz wide spectral portion of the first signal.

The measurement front end 204 then receives and conditions the RF input signal, which is typically a broadband CATV signal, which includes the first signal. The measurement front end 204 conditions the RF input signal and then provides at least a portion of the RF input signal to the RF conversion circuit 208. The RF conversion circuit 208 performs a frequency conversion on the RF input signal such that the select spectral portion of the first signal is converted to fall within the intermediate signal bandwidth. In the example described herein, the intermediate signal bandwidth extends from 5 kHz to 285 kHz.

The down-converted RF input signal is then provided to the gain stage 210 which provides amplification at a level determined by the DSP/C 108. The band pass filter 212 then receives the down-converted RF input signal from the gain stage 210 and provides filtering thereto which substantially removes any frequency components outside the intermediate signal bandwidth. The resulting filtered signal therefore has the intermediate signal bandwidth. The filtered signal constitutes the intermediate signal.

The A/D converter 104 then performs pre-sampling on the intermediate signal to generate a pre-sampled intermediate signal which is provided to the FPGA 218.

The FPGA 218 initially performs operations in the peak mode, which is used to provide initial signal level measurements used for scaling. In particular, the FPGA 218, is first placed in peak mode by the DSP/C 108. In the peak mode, the FPGA 218 receives the pre-sampled intermediate signal from the A/D converter 104 and identifies and stores a plurality of peak value samples of the pre-sampled intermediate signal. Each peak value sample is a sample that has maximum amplitude for a set of a predetermined number of samples in the pre-sampled intermediate signal. For example, the FPGA 218 may identify and store the peak value sample of every ten samples for eight sets of ten samples, thereby producing eight peak value samples.

The FPGA 218 provides the peak value samples to the DSP/C 108. The DSP/C 108 then utilizes the peak value samples to determine the appropriate normalization adjustments for the various RF circuit components. Specifically, the DSP/C 108 controls the operation of the measurement front end 204 to increase or decrease the attenuation level and or the amplification level such that the RF input signal will be scaled for accurate A/D conversion and measurement.

After operation in the peak mode for a short duration of time, such as for example, 80 microseconds, the DSP/C 108 causes the FPGA 218 to operate in the sample mode. In sample mode, the FPGA 218 simply operates as a one-sample buffer. Accordingly, the FPGA 218 in the sample mode receives the pre-sampled intermediate signal and provides a buffer that contains the current sample of the pre-sampled intermediate signal.

In the peak mode, the DSP/C 108 receives from the FPGA 218 the digital intermediate signal. To this end, the DSP/C 108 obtains every Nth sample of the pre-sampled intermediate signal from the FPGA 218 buffer. According to the present invention, the sample rate of the digital intermediate signal is less than twice the cut-off frequency of the intermediate signal.

In the sample mode, the DSP/C 108 calculates an RMS power measurement representative of the signal power level of the select spectral portion of the first signal. To this end, the DSP/C 108 squares each received sample of the digital intermediate signal and adds the squared result to a running sum of such squared samples. After a predetermined number of samples have been squared and summed, the DSP/C 108 completes the RMS calculation by taking the square root of the sum and dividing the result by the number of samples. The resulting value represents the RMS signal energy for the select spectral portion of the first signal, and is referred to herein as the partial energy measurement.

It is noted that under ordinary circumstances, the use of a digital signal having a sample rate of less than twice the cut-off frequency of the input analog signal would cause errors in the measurement performed by digital processing circuitry. In particular, the high frequency components that exceed one-half the sampling rate can cause aliasing in the digital signal, which causes measurement errors. The measurement method of the present invention, however, does not exhibit such errors, at least in significant amounts.

Specifically, it has been observed that a digital power measurement such as an RMS power measurement of an undersampled random noise signal will not produce a large amount of error. If enough samples are taken, the random nature of the noise signal will cause the RMS power measurement to approximate the true power measurement. Specifically, while undersampling introduces an error component to the RMS calculation to some extent, the random nature of white noise signals causes that error component to average out to approximately zero over time.

It has further been observed that the digital modulation techniques employed in digital CATV signals produce a summation of random sinusoids that approximates white noise. Thus, RMS power measurements of such digitally modulated CATV signals will closely approximate the true RMS power of such signals if enough samples are taken. It has been shown experimentally that 1953 samples taken a sample rate of 7812 provides a sufficiently accurate RMS power calculation of an intermediate signal having a cut-off frequency of 285 kHz. It has been observed that such a number of samples is sufficiently high enough to allow the random nature of measured signal to cause the measurement error that arises due to undersampling to average out to close to zero.

Those of ordinary skill in the art may readily determine the number of samples that need to be taken at a particular undersampling rate to reduce the RMS measurement error to satisfactory levels for a particular intermediate signal cut-off frequency. For example, a general purpose computer may be used to simulate RMS measurements on a simulated input signal using one of several sample rates and/or several numbers of samples. The simulated input signal would comprise an input RF noise signal sampled at a relatively high rate, such as five or ten times the cut-off frequency. The general purpose computer would then carry out several test measurements, each test measurement having a simulated sample rate and using a predetermined number of samples. To simulate a particular sample rate, the computer may be programmed to use every $N^{th}$ sample of the simulated RF noise input signal, where N is selected to correspond to the desired test sample rate. The general purpose computer then compares the test measurements to the known RMS power of the input RF noise signal. From the comparison, a sample rate and number of samples may be selected that produces a satisfactory error level.

In any event, once the DSP/C 108 generates the partial power measurement corresponding to the select spectral portion of the first signal, the DSP/C 108 may perform further operations to obtain the total power measurement corresponding to the entire first signal. To this end, the DSP/C 108 may employ one of a plurality of methods. In one method, the DSP/C 108 controls the operations of the signal power measurement apparatus 100 to obtain a plurality of partial power measurements, each corresponding to one of a plurality of partial spectral portions that make up the entire first signal spectrum. In other words, the DSP/C 108 generates a partial power measurement for each 280 kHz portion of the first signal, until a partial power measurement has been generated for every 280 kHz portion of the first signal. The DSP/C 108 then sums the partial power measurements to provide a power measurement of the entire first signal.

In the other method, the DSP/C 108 extrapolates the power measurement for the entire first signal using the partial power measurement. Such an extrapolation may include simply multiplying the partial power measurement by the ratio of the first signal bandwidth to the select spectral portion bandwidth. For example, if the first signal bandwidth is 6 MHz, and the select spectral portion bandwidth is 280 kHz, then the DSP/C 108 may obtain the power measurement for the entire first signal by multiplying the partial power measurement by 6000/280, or 21.43.

The extrapolation method described above provides a reasonably accurate measurement when the first signal is a digitally modulated signal modulated using QAM, QPR, or CAP modulation techniques, each of which generates a pseudo-random signal spectrum that approximates white noise. White noise has a substantially flat power spectrum, thus allowing the extrapolation of the first signal power measurement from a power measurement of a relatively small spectral portion of the first signal using simple multiplication.

Regardless of which method is employed to obtain the power measurement for the entire first signal, the present invention performs a digital power measurement on the digitally modulated input RF signal using an undersampled digital intermediate signal to reduce the computational requirements of the measurement circuitry, shown herein as the DSP/C 108. In particular, the A/D converter 104 provides a digital intermediate signal for measurement by the DSP/C 108 that is sampled at less than twice the highest frequency component of the intermediate signal. In the exemplary embodiment described herein, the DSP/C 108 uses a digital intermediate signal having a sample rate of 7812 samples per second to sample an intermediate signal having a cutoff frequency of 285 kHz. If undersampling were not used, or in other words, if the digital intermediate signal had a sample rate that satisfies the Nyquist criterion, then the DSP/C 108 would be required to process samples generated at a rate of at least 570,000 samples per second. With such a sampling rate, the computational load on the DSP/C 108 would greatly increase.

One tangible result of the undersampling technique of the present invention is that the DSP/C 108 in the exemplary embodiment described herein may comprise a microprocessor that carries out both the control functions ascribed above and the RMS measurement function. If, however, the DSP/C 108 were to receive 570,000 samples per second instead of 7812, then either a separate high speed DSP circuit would be required, or at least an extremely high speed and high cost microprocessor would be required.

Figure 3:
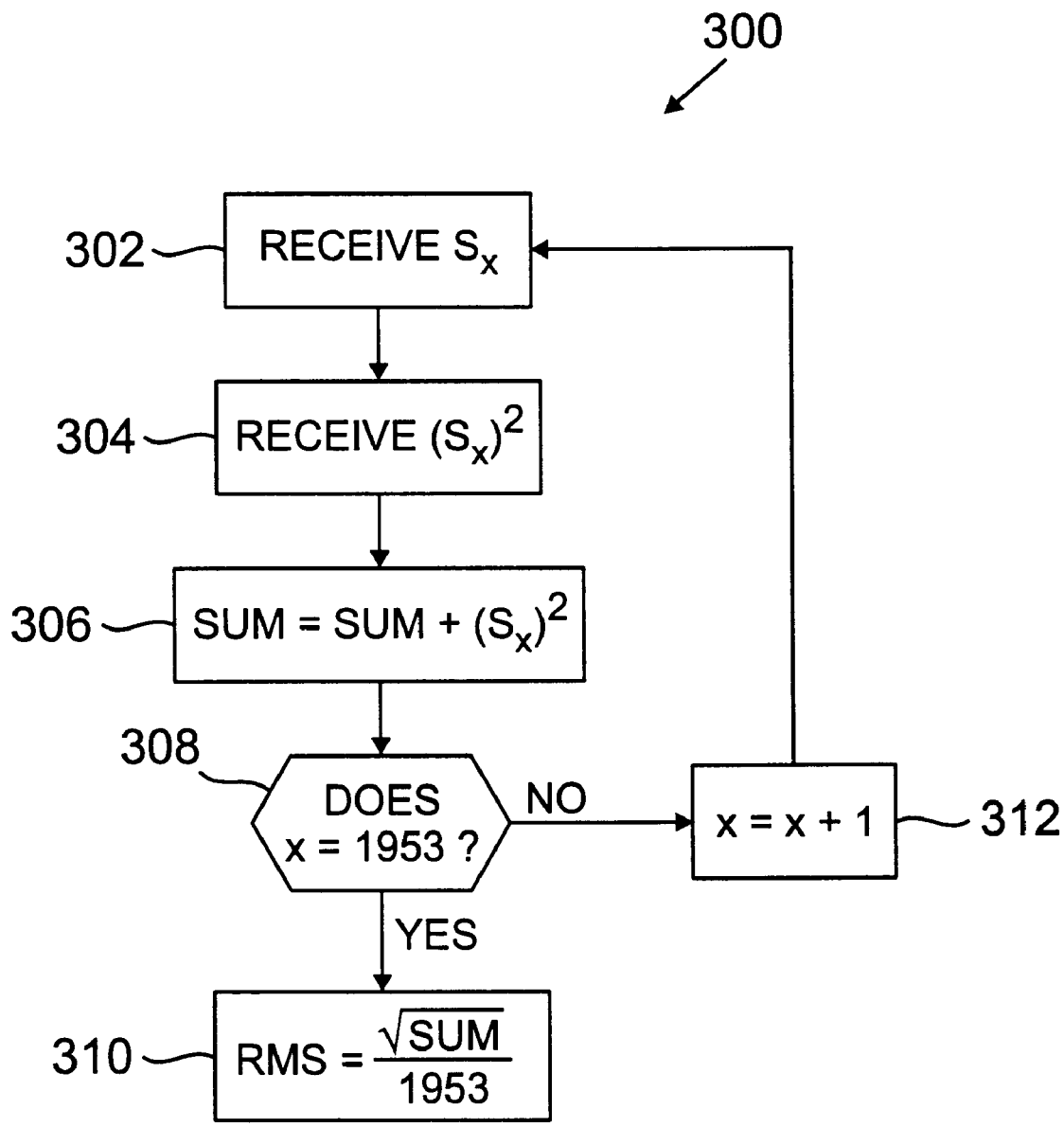
FIG. 3 shows a flowchart illustrating the method of calculation of the power measurement that is employed by the power measurement apparatus of the present invention.

In FIG. 3 there is shown a flowchart 300 of an exemplary set of operations carried out by the DSP/C 108 of FIGS. 1 and 2 to calculate a partial power measurement that corresponds to a select spectral portion of a digitally modulated PF signal. In the example set forth in FIG. 3, the digitally modulated RF signal is an RF carrier signal modulated by a digital television baseband signal using QAM, QPR, CAP, or other similar digital modulation techniques. The carrier signal frequency is a CATV channel frequency between 5 MHz and 890 MHz, the signal bandwidth is 6 MHz, and the select spectral portion bandwidth is 280 kHz. The flowchart 300 implements the formula: partial power measurement= square root $[(S_1)^2+(S_2)^2+ \ldots +(S_{3,906})^2]$.

In step 302, the DSP/C 108 receives a digital sample, $S_X$, of the digital intermediate signal from the FPGA 218. The digital sample is in the form of a byte of digital data that has a value that is representative of an amplitude of the intermediate signal at a particular instant in time. The DSP/C 108 then executes step 304.

In step 304, the DSP/C 108 performs a squaring operation that yields a value that is equal to the square of the digital sample value, or $(S_X)^2$. The DSP/C 108 then executes step 306.

In step 306, the DSP/C 108 adds the squared digital sample to a cumulative sum of squared digital samples. In other words, the DSP/C 108 performs the operation of SUM=SUM+$(S_X)^2$. The DSP/C 108 then proceeds to execute step 308.

In step 308, the DSP/C 108 determines whether the number of digital samples received is equal to 1953, or in other words, whether X=1953. If so, then the DSP/C 108 proceeds to step 310. If, however, S<1953, then the DSP/C proceeds to step 312. In step 312, the DSP/C 108 increments X and then returns to step 302.

Referring to step 310, if 1953 samples have been squared and summed, the DSP/C takes the square root of SUM and divides the resulting square root by 1953, which completes the RMS power calculation for the select spectral portion of the digitally modulated RF signal.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

We claim:

1. An apparatus for measuring power of a first signal, the first signal comprising a carrier signal modulated by an information signal, the first signal having a signal strength spectrum that approximates a signal strength spectrum of white noise, the apparatus comprising:

a) an RF receiver for receiving the first signal and generating an intermediate signal therefrom, the intermediate signal comprising at least a portion of the first signal and having a bandwidth and a cutoff frequency;

b) an A/D stage operably connected to the RF receiver to receive the intermediate signal therefrom, said A/D stage operable to generate a digital intermediate signal from the intermediate signal, the digital intermediate signal having a sample rate of less than twice the cut-off frequency;

c) a digital signal processing circuit operable to generate a power measurement on the digital intermediate signal using a sufficient number of samples of the digital intermediate signal to reduce an error due to undersampling to below a predetermined amount, the power measurement representative of the power of at least a portion of the first signal.

2. The apparatus of claim 1 wherein the first signal has a first carrier signal frequency corresponding to a CATV channel frequency and the RF receiver is further operable to perform a frequency conversion on the first signal in order to generate the intermediate signal.

3. The apparatus of claim 2 wherein the RF receiver performs a frequency conversion on the first signal to generate a down-converted first signal, and wherein the RF receiver is further operable to perform filtering on the down-converted first signal to produce the intermediate signal having the bandwidth and the cut-off frequency.

4. The apparatus of claim 1 wherein the A/D converter has a sampling rate that is less than twice the cut-off frequency.

5. The apparatus of claim 1 wherein the RF receiver is further operable to receive the first signal wherein the first signal comprises a digitally modulated RF signal, and wherein the digital signal processing circuit is operable to generate the power measurement on the digital intermediate signal such that the power measurement is representative of the power of at least a portion of the digitally modulated RF signal.

6. The apparatus of claim 1 wherein the RF receiver is further operable to receive the first signal wherein the first signal comprises a digitally modulated RF signal, said digitally modulated RF signal comprising a digital baseband signal modulated onto an RF carrier signal using one of QAM, QPR, and CAP digital modulation techniques, and wherein the digital signal processing circuit is operable to generate the power measurement on the digital intermediate signal such that the power measurement is representative of the power of at least a portion of the digitally modulated RF signal.

7. The apparatus of claim 1 wherein said digital signal processing circuit is further operable to generate the power measurement on the digital intermediate signal by performing a root mean squares calculation on the sufficient number of samples of the digital intermediate signal.

8. The apparatus of claim 1 further comprising a controller, the controller operable to:

cause the RF receiver to generate the intermediate signal wherein the intermediate signal is representative of a select spectral portion of the first signal;

cause the digital signal processing circuit to generate the power measurement wherein the power measurement comprises a partial power measurement that corresponds to the select spectral portion of the first signal;

cause the RF receiver to generate a plurality of subsequent intermediate signals, each of said plurality of subsequent intermediate signals being representative of a distinct select spectral portion of the first signal, such that the intermediate signal and the plurality of subsequent intermediate signals taken together represent the first signal, cause the digital signal processing circuit to receive a plurality of subsequent digital intermediate signals from the A/D converter, each of said plurality of subsequent digital intermediate signals corresponding to each of the plurality of subsequent intermediate signals, cause the digital signal processing circuit to generate a plurality of subsequent partial power measurements using each of the plurality of subsequent digital intermediate signals.

9. The apparatus of claim 1 wherein the RF receiver is further operable to generate the intermediate signal such that the intermediate signal corresponds to a select spectral portion of the first signal, and wherein the digital signal processing circuit is further operable to generate a partial power measurement using a root mean squares calculation on the digital intermediate signal, and the digital signal processing circuit is further operable to extrapolate a power measurement of the first signal from the partial power measurement.

10. The apparatus of claim 1 further comprising a controller operable to control the operations of the RF receiver.

11. The apparatus of claim 10 wherein the controller and the digital signal processing circuit each comprise the same microprocessor.

12. A method of measuring power of a first signal, the first signal comprising a carrier signal modulated by an information signal, the first signal having a signal strength spectrum that approximates a signal strength spectrum of white noise, the method comprising:

a) receiving the first signal and generating an intermediate signal therefrom, the intermediate signal comprising at least a portion of the first signal and having a bandwidth and a cutoff frequency;

b) generating a digital intermediate signal from the intermediate signal, the digital intermediate signal having a sample rate of less than twice the cutoff frequency;

c) using digital signal processing to generate a power measurement on the digital intermediate signal using a sufficient number of samples of the digital intermediate signal to reduce an error due to undersampling to below a predetermined amount, the power measurement representative of the power of at least a portion of the first signal.

13. The method of claim 12 wherein the first signal has a first carrier signal frequency corresponding to a CATV channel frequency and step a) further comprises performing a frequency conversion on the first signal in order to generate the intermediate signal.

14. The method of claim 13 wherein step a) further comprises performing a frequency conversion on the first signal to generate a down-converted first signal, and further filtering the down-converted first signal to produce the intermediate signal having the bandwidth and the cut-off frequency.

15. The method of claim 12 wherein step b) further comprises generating the digital intermediate signal using an A/D converter that has a sampling rate that is less than twice the cut-off frequency.

16. The method of claim 12 wherein step a) further comprises receiving the first signal wherein the first signal comprises a digitally modulated RF signal, and wherein step c) further comprises using digital signal processing to generate the power measurement on the digital intermediate signal such that the power measurement is representative of the power of at least a portion of the digitally modulated RF signal.

17. The method of claim 12 wherein step a) further comprises receiving the first signal wherein the first signal comprises a digitally modulated RF signal said digitally modulated RF signal comprising a digital baseband signal modulated onto an RF carrier signal using one of QAM, QPR, and CAP digital modulation techniques, and wherein step c) further comprises using digital signal processing to generate the power measurement on the digital intermediate signal such that the power measurement is representative of the power of at least a portion of the digitally modulated RF signal.

18. The method of claim 12 wherein step c) further comprises using digital signal processing to generate the power measurement on the digital intermediate signal by performing a root mean squares calculation on the sufficient number of samples of the digital intermediate signal.

19. The method of claim 12 wherein step a) further comprises generating the intermediate signal wherein the intermediate signal is representative of a select spectral portion of the first signal, wherein step c) further comprises generating the power measurement wherein the power measurement comprises a partial power measurement corresponding to the select spectral portion, and further comprising the steps of:

d) generating a plurality of subsequent intermediate signals, each of said plurality of subsequent intermediate signals being representative of a distinct select spectral portion of the first signal, such that the intermediate signal and the plurality of subsequent intermediate signals taken together represent the first signal, and e) generating a plurality of subsequent digital intermediate signals from the subsequent plurality of intermediate signals, each of said plurality of subsequent digital intermediate signals corresponding to one of the plurality of subsequent intermediate signals, f) using digital signal processing to generate a plurality of subsequent partial power measurements using each of the plurality of subsequent digital intermediate signals.

20. The method of claim 12 wherein step a) further comprises generating the intermediate signal such that the intermediate signal corresponds to a select spectral portion of the first signal, and wherein step c) further comprises using digital signal processing to generate a partial power measurement using a root mean squares calculation on the digital intermediate signal, and to extrapolate the power measurement of the first signal from the partial power measurement.

* * * * *